United States Patent
Bhalsod et al.

[11] Patent Number: 5,716,094
[45] Date of Patent: Feb. 10, 1998

[54] VEHICLE SEAT WITH PUSHER BLOCK

[75] Inventors: Dilip Mulji Bhalsod, Troy; Rasik Dholakia, Orion; Michael John Wendzinski, Grosse Pointe Park, all of Mich.

[73] Assignee: General Motors Corporation, Detroit, Mich.

[21] Appl. No.: 812,144

[22] Filed: Mar. 6, 1997

[51] Int. Cl.⁶ ........................................ B60N 2/42
[52] U.S. Cl. .................. 296/188; 296/68.1; 297/216.13
[58] Field of Search ................. 297/216.13; 296/188, 296/189, 146.6, 68.1

[56] References Cited

U.S. PATENT DOCUMENTS

| | | | |
|---|---|---|---|
| 4,231,607 | 11/1980 | Bohlin | 293/128 |
| 4,438,969 | 3/1984 | Kamijo et al. | 296/146.9 |
| 4,451,078 | 5/1984 | Maeda | 296/188 |
| 4,512,604 | 4/1985 | Maeda et al. | 296/65 A |
| 4,623,196 | 11/1986 | Roney | 297/464 |
| 4,679,854 | 7/1987 | Putsch et al. | 297/486 |
| 5,000,509 | 3/1991 | Sinnhuber et al. | 296/188 |
| 5,110,176 | 5/1992 | Curtis | 296/188 |
| 5,328,234 | 7/1994 | Daniel et al. | 297/216.16 |

*Primary Examiner*—Peter R. Brown
*Attorney, Agent, or Firm*—Patrick M. Griffin

[57] ABSTRACT

A vehicle seat and door cooperate in the event of the door being pushed inwardly by a side impact to move the door, and any occupant strapped into the seat, away from the door. The door is a standard design, with a protruding arm rest spaced from the nearest side member of a standard, U shaped seat back frame. The nearest side member has a solid pusher block fixed thereto that continually overlaps and crosses the location of the arm rest at all possible positions of the seat and seat back frame. When the door is pushed inwardly, the arm rest contacts the pusher block, pushing it and the seat back frame to the side.

2 Claims, 3 Drawing Sheets

VEHICLE SEAT WITH PUSHER BLOCK

TECHNICAL FIELD

This invention relates to vehicle seats in general, and specifically to a seat with a pusher block added to the seat back frame in a location designed to interact with an existing door trim member.

BACKGROUND OF THE INVENTION

Federal standards for side impact resistance have been met with the use of reinforcing beams inside the door that increase the mass and stiffness of the door to resist inward door buckling. As a practical matter, however, the door alone cannot be reinforced to a degree sufficient to totally resist buckling. The Federal testing standards recognize this, and mandate acceptable acceleration levels (in effect, force levels) that a crash test dummy may experience during a standard 33.5 mph side impact test. These test levels are even specific as to particular locations on the test dummy, such as upper rib, lower rib, and lower spine area, prescribing an average acceleration value of lower spine and higher of the two rib locations, known as the Thoracic Trauma Index, or TTI.

Most patented devices that relate to seats and side impact are all variations on a common theme of transferring the side impact force at or below the lower seat frame of the vehicle. Generally, an aligned array of pipes or similar structures is placed under the lower seat cushions, extending from one door sill, under one seat, through the center floor console, under the next seat and into the opposite door sill. Upon impact on either door, the force is transferred completely across the car and resisted and absorbed by the entire array of cooperating structures. Examples may be seen in U.S. Pat. No. 5,110,176 issued May 5, 1992 to Curtis; U.S. Pat. No. 5,000,509 issued Mar. 19, 1991 to Sinnhuber et al; U.S. Pat. No. 4,451,078 issued May 29, 1984 to Maeda; U.S. Pat. No. 4,438,969 issued Mar. 27, 1984 to Kamijo, et al; and U.S. Pat. No. 4,231,607 issued Nov. 4, 1980 to Bohlin. A variation of the same theme puts a similar array of structures higher up, running from one door, through the seat back of one seat into the seat back of the next seat and into the opposite door. However, if the space beneath the seats is taken up with heavy force transfer structures, there is no room for other components, such as power seat adjusters and recliners, and there is a substantial vehicle weight increase as well. Putting similar structures into the seat backs would interfere with adjusting the angle of the seat backs, and presents similar weight penalties.

Other approaches involve changes to the seat back frame alone. U.S. Pat. No. 5,447,360 issued Sep. 5, 1995 to Hewko et al. discloses a seat back with a massive side member and internal cross bracing, designed to stiffen the seat, and allow it to resist impact forces applied to it by an inwardly buckling door. Such additional structure clearly would stiffen the seat back, but would also add considerable weight. U.S. Pat. No. 5,328,234 issued Jul. 12, 1994 to Daniel et al. proposes, instead of a stiffened seat, a seat that will move considerably in response to the side impact force, literally rotating to the side to move the seat occupant away from the intruding side of the vehicle. This, too, represents a significant change in normal seat design that would be difficult to incorporate quickly into an existing vehicle design. Other patents add large external wings protruding past the typical outline of the seat trim cover, intended to wrap around the occupant. Examples may be seen in U.S. Pat. No. 4,623,196 issued Nov. 18, 1986 to Roney and 4,679,854 issued Jul. 14, 1987 to Putsch et al. Besides involving large changes in the basic seat design, there would not likely be room in many vehicles between the door and seat to accommodate such protruding seat wing designs.

SUMMARY OF THE INVENTION

The invention provides a new approach capable of meeting the Federal side impact standards noted above, but which makes very little change to the existing vehicle and seat design. There is literally no change to the vehicle door and no visible change to the vehicle seat. No additional room between the side of the vehicle seat and the inner surface of the vehicle door is needed. The structural change made to the seat back frame is simple, lightweight, and inexpensive, and would require no basic change to the seat back frame structure or the way it is manufactured. The approach is thus ideally suited to a so called "running change" that can be easily made to an existing vehicle design with no disruptions in production.

In the preferred embodiment disclosed, a conventional door structure and a seat of conventional size, shape and appearance are used. The lower seat frame is fixed to the vehicle body floor, but is capable of traveling fore and aft adjusting motion. A seat back frame pivoted to the lower seat frame has only the typical pair of generally parallel side members, with no additional diagonal cross bracing or other additional stiffening structure. The seat back frame can be pivoted over a range of angular positions with a standard recliner mechanism. A standard seat cover surrounds the seat back frame, covering the side members to a conventional thickness, with no protrusions or additional wing structures on the side. The inner surface of the door includes a trim member, a combination door pull and arm rest as disclosed, which is spaced from the side of the seat back. The door pull and arm rest is substantially horizontal, and long enough that it overlaps with the adjacent one of the seat back frame side members regardless of the range of adjusted positions that the seat back frame may undergo in its combined fore-aft and reclining motion. The only change to the pre-existing vehicle structure is the addition of a substantially solid pusher block, which is welded to the outside of the adjacent seat back frame side member. The pusher block is attached at a location that is well above the vehicle floor, and above the lower seat frame, and is long enough in the vertical direction that it will overlap with (but does not abut) the door arm rest over the full range of the motion of the seat back. The pusher block is thin enough in the horizontal direction that it does not protrude beyond the standard outline of the seat cover.

In the event of a side impact that moves the door inwardly, the door arm rest contacts the seat pusher block earlier than it would have otherwise contacted the seat back frame. The force of contact is transferred to the seat back frame at a relatively high point and therefore, applies a relatively high resultant moment. The seat back frame is pushed to the side, away from the inwardly buckling door, and the seat occupant with it.

BRIEF DESCRIPTION OF THE DRAWINGS

These and other features of the subject invention will appear from the following written description, and from the drawings, in which.

DESCRIPTION OF THE PREFERRED EMBODIMENT

Figure 1:
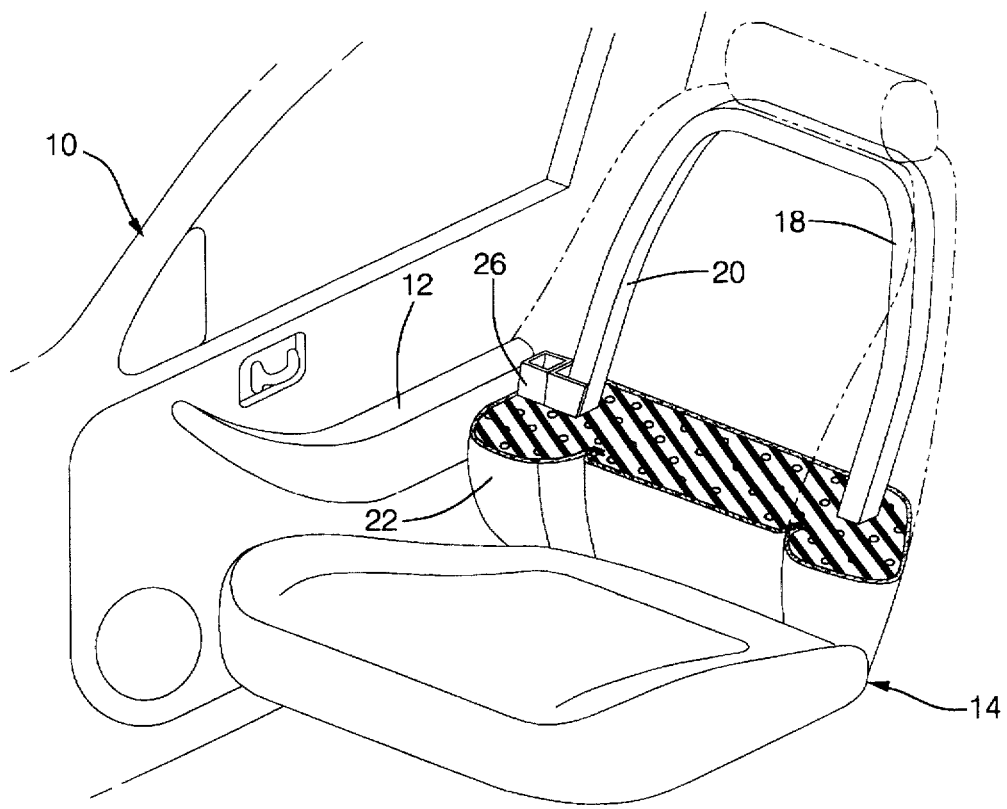
FIG. 1 a perspective view of a standard size seat, with the trim partially cut away to show one end of an embodiment of the invention and its basic spatial relationship to a standard size door arm rest.

Referring first to FIG. 1, a standard vehicle door is indicated generally at 10. Door 10 has conventional inner reinforcement beams, not illustrated, but is prone, as are all vehicle doors, to inward motion when subjected to a sufficient side impact. Door 10 has, on its inner surface, a combined arm rest (and door pull) 12, of standard size and material, which extends substantially horizontally. The arm rest 12 protrudes inwardly from the inner surface of the door so as to be manually accessible to a seat occupant, providing the two functions that its name implies, but no other function, in a conventional vehicle. A vehicle seat of standard size, shape and construction is indicated generally at 14. Seat 14 has a lower, cushion frame 16 and an upper, seat back frame of typical U shape comprised of a pair of parallel side members 18 and 20. The seat back side members 18 and 20 are basically identical, with no extra structural stiffening applied to either, and with no diagonal cross bracing running between them. The side member 18 is distinctive, however, by virtue of being outboard of the other, or nearest to the inner surface of the door 10, and by the addition of one structure described below. The lower ends of the seat back side members 18 and 20 are pivoted to the cushion frame 16 by a conventional recliner mechanism, which works in a fashion described in more detail below. The side members 18 and 20 are covered and padded by a seat cover 22, which is cut away partially, with its outer surface shown by a dotted line. The seat cover 22 has a conventional size and shape, meaning that it follows the same basic contour as the seat back frame itself, with no protrusions, and extends outboard of the side member 18 only to a conventional thickness. As such, the seat cover 22 does not directly abut the inner surface of the door 10, though it comes closest to the arm rest 12.

Figure 3:
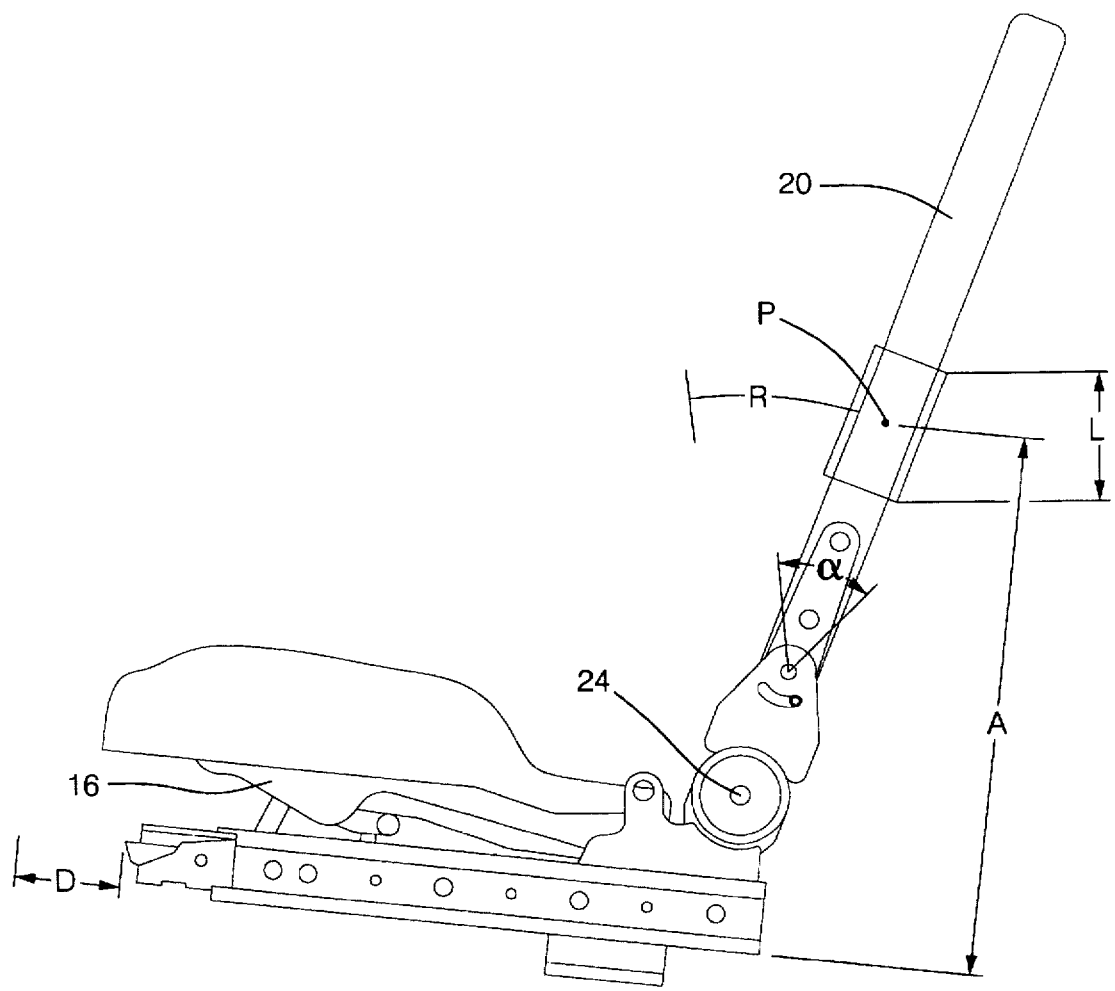
FIG. 3 is a side view of the seat frame showing the location of the pusher block and its range of motion relative to the location of the door arm rest.

Referring next to FIG. 3, additional aspects of the inter relationship of seat 14 and door 10 are illustrated. As noted, the seat back frame side members 18 and 20 are pivoted to the cushion frame 16 by a recliner mechanism 24, which allows a relative pivoting over an angle α. In addition, the seat 14 can move fore and aft over a distance D. As a consequence, any point on the seat back frame outboard side member 18 such as that indicated at P will move over a flattened arc having a total range of motion R (measured between the furthest fore and aft points). Furthermore, depending on the relative location of the generally horizontally extending arm rest 12, the location of point P can be chosen such that a length L of the side member 18 extending to either side of point P will, over the entire range of motion R, overlap with, or cross, the arm rest 12. A point P so chosen will be spaced well above the seat cushion frame 16, at a distance A measured relative to the vehicle floor to which seat cushion frame 16 is fixed. The purpose of so designating a length of the seat back frame side member 18 is described next.

Figure 2:
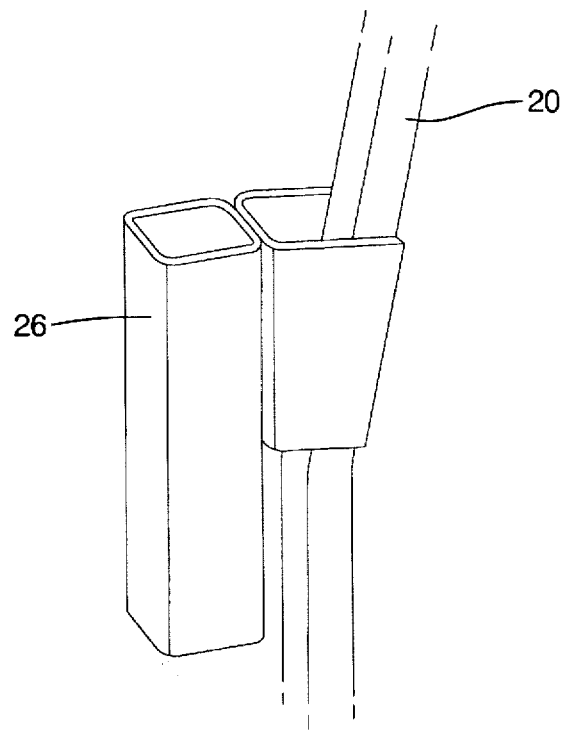
FIG. 2 an enlargement of the pusher block and the portion of the seat back frame to which it is attached.

Referring next to FIG. 2, the only alteration to seat 14 is a pusher block 26, attached to the outside of the outboard seat back frame side member 18 at a location corresponding to the length L described above. Pusher block 26 is basically just a short length of the same type of tubing that is used to manufacture the side member 18, and is fixed thereto by any suitable means, such as welding, bolting, or both. Pusher block 26 does not extend past the outline of the seat cover 22, and the only alteration required to cover 22 would be a cut out in the foam large enough to accommodate it. An observer of the completed seat 14 would observe no protrusions beyond the normal thickness of seat cover 22, and the presence of the pusher block 26 would be essentially undetectable. It will be understood that the pusher block 26, attached as described at the location described, would make the same, continual crossing overlap with the door arm rest 12, over the entire range of motion R.

Figure 4:
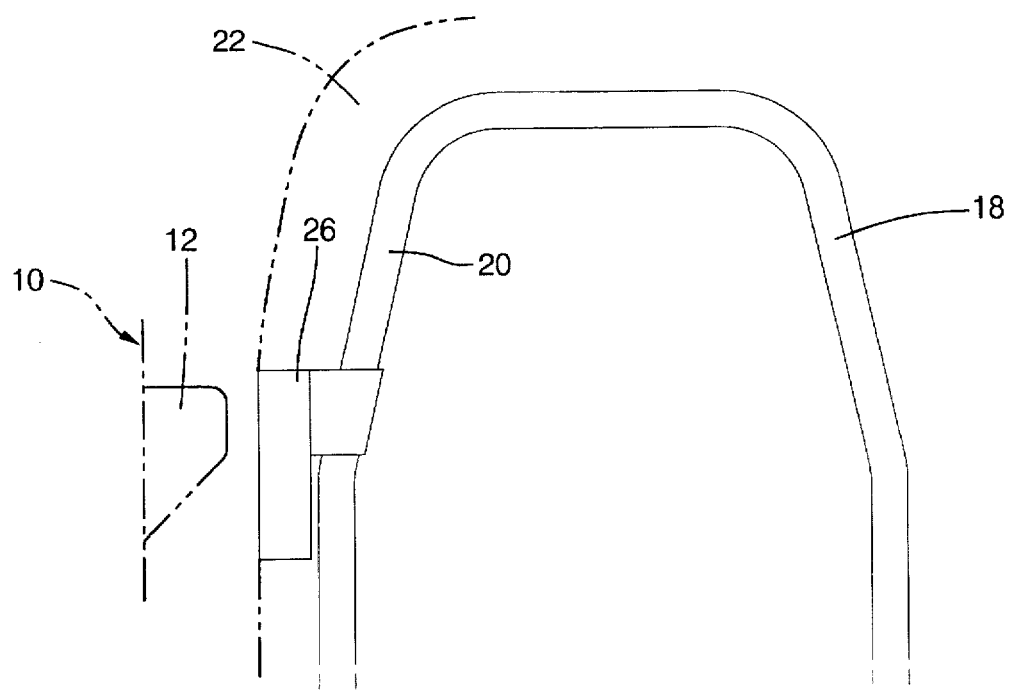
FIG. 4 is a front view of a seat back frame and pusher block shown in relation to the adjacent inner surface portion of the door prior to any impact.
Figure 5:
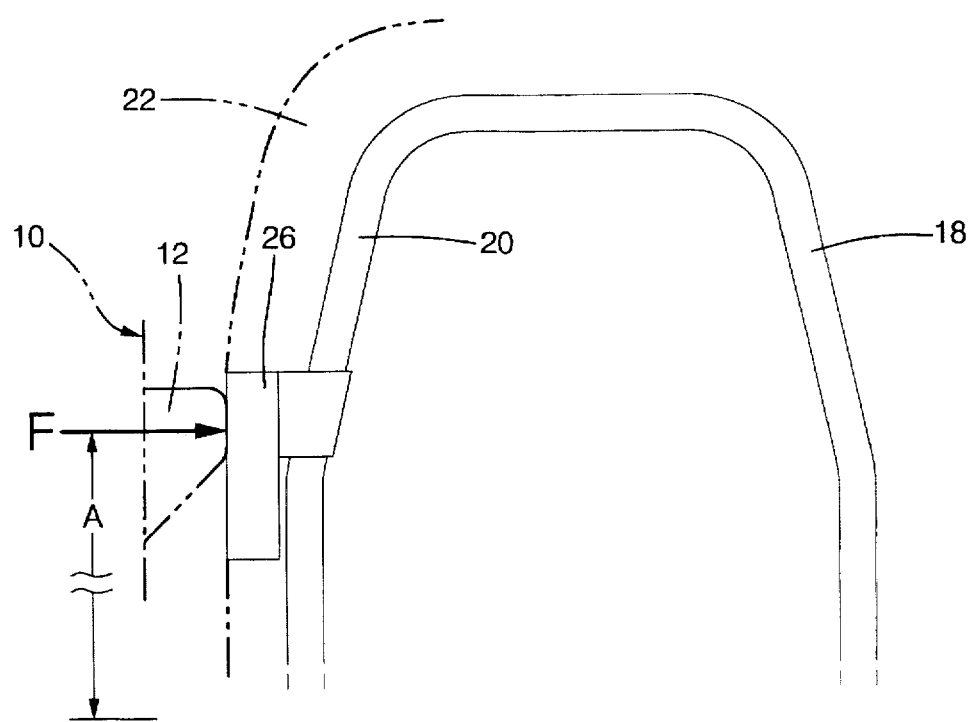
FIG. 5 shows the result of an impact of the door arm rest upon the pusher block.

Referring next to FIGS. 4 and 5, the operation of pusher block 26 is illustrated. The seat cover 22 is not shown, so as to better illustrate the pusher block 26 but, again, it would not be visible or detectable in the actual vehicle. In the normal location shown in FIG. 4, the door arm rest 12 of the closed door 10 is spaced from the pusher block 26 by essentially the same distance that the outer surface of the seat cover 22 is. No matter what position the seat 14 and seat back frame side member 18 have been adjusted to, there will be crossing overlap between pusher block 26 and the door arm rest 12. In the event of an impact with the outside of door 10 strong enough to push the inner surface of door 10 inwardly, the arm rest 12 will contact the pusher block 26, with only the outer fabric layer of the seat cover 22 intervening. The contact will occur fairly quickly, substantially more so than would contact between the inner surface of the door 10 and the side member 18 alone if the arm rest 12 and overlapping pusher block 26 were not present. The force of impact is indicated at F. That force would act on the seat 14 with a moment arm substantially equal to the distance A described above, creating a significantly greater moment on seat 14 than an equivalent impact force acting on or below the seat cushion frame 16. As a consequence of the larger moment arm A, the impact force F would act on the seat back frame very effectively to push it to the side, inboard, and away from the inwardly moving door 10. Trim members like armrest 12, while they are padded on the exterior, still generally have a substantially solid, molded plastic foundation, so that impact forces will be transmitted efficiently therefrom to the pusher block 26. As the seat back frame side member 18 is pushed away from the moving door 10, the rest of the seat back frame moves with it, as will an occupant strapped into seat 14.

In conclusion, the operation described above allows the impact force of door 10 to act very efficiently on a seat 14 that has been modified very slightly, and in a way that is essentially undetectable. No change at all is made to door 10, arm rest 12, seat cushion frame 14. No significant change, and no visible change, is made to seat cover 22. Only the addition of the pusher block 26 itself to side member 18, in the location configured as described, is needed. Other embodiments of the pusher block 26 could be provided. In a non retrofit, original design, it might be possible to integrate the pusher block 26 directly into the side member 18, for example, or to manufacture it from some other substantially solid material, such as rigid plastic. Other shapes could suffice, such as a cylinder inserted over the side member 18, but having a similar length and basic location, and having a similar protrusion thickness relative to the side member 18 (less than the seat cover basic thickness). The pusher block could even be combined with another force transfer member extending across and between the side members 18 and 20, so as to transfer force more directly to the inboard side member 20 than it would be transferred only through the top of the basic U shaped seat back frame. Therefor, it will be understood that it is not intended to limit the invention to just the embodiment disclosed.

We claim:

1. In a vehicle having a passenger seat with a lower frame and a seat back frame with a pair of generally parallel side members joined to said seat lower frame, said seat back also having a standard seat cover surrounding said vehicle side members, said vehicle also having a door adjacent to said seat with a standard, substantially solid trim member on the inner surface of said door and protruding outwardly therefrom and aligned with and spaced from the nearest seat back side member when said door is closed, the improvement comprising, a substantially solid pusher block fixed to said nearest seat back side member above said seat lower frame and protruding from nearest seat back side member at a location directly opposed to said door trim member, said pusher block enclosed by said seat cover, whereby, in the event of a side impact with said door sufficient to move it inwardly, said door trim member makes contact with said seat back pusher block before said door inner surface makes contact with said seat back side member, thereby shifting said seat back frame to the side relative to and away from said inwardly moving door.

2. In a vehicle having a passenger seat with a lower frame and a seat back frame with a pair of generally parallel side members joined generally to said seat lower frame and adapted to move fore and aft relative to said vehicle and to tilt back and forth relative to said lower seat frame is that any point on said side members moves over a predetermined resultant range of motion, said seat back also having a standard seat cover surrounding said vehicle side members said vehicle also having a door adjacent to said seat with a standard, substantially solid trim member on the inner surface of said door and protruding outwardly therefrom and aligned with and spaced from the nearest seat back side member when said door is closed, the improvement comprising, a substantially solid pusher block fixed to said nearest seat back side member above said seat lower frame at an attachment location chosen to overlap with the location of said door trim member over substantially the entire range of motion of said attachment point, said pusher block protruding from said attachment location toward said door trim member but located entirely within said standard seat cover, whereby, in the event of a side impact with said door sufficient to move it inwardly, said door trim member makes contact with said seat back pusher block before said door inner surface makes contact with said seat back side member, thereby shifting said seat back frame to the side relative to and away from said inwardly moving door.

* * * * *